United States Patent [19]

Uehara

[11] Patent Number: 5,047,881

[45] Date of Patent: Sep. 10, 1991

[54] RECORDING AND/OR REPRODUCING APPARATUS

[75] Inventor: Tsukasa Uehara, Tokyo, Japan

[73] Assignee: Canon Kabushiki Kaisha, Tokyo, Japan

[21] Appl. No.: 622,363

[22] Filed: Dec. 5, 1990

Related U.S. Application Data

[63] Continuation of Ser. No. 449,301, Dec. 5, 1989, abandoned, which is a continuation of Ser. No. 243,205, Sep. 9, 1988, abandoned, which is a continuation of Ser. No. 107,860, Oct. 7, 1987, abandoned, which is a continuation of Ser. No. 648,700, Sep. 7, 1984, abandoned.

[30] Foreign Application Priority Data

Sep. 12, 1983 [JP] Japan .......................... 58-142035[U]

[51] Int. Cl.[5] .......................... G11B 17/035; G11B 5/82
[52] U.S. Cl. .............................. 360/99.05; 360/96.5; 360/99.12
[58] Field of Search ................ 360/86, 96.5, 133, 135, 360/97.01, 99.05, 99.12; 346/137; 368/270, 271

[56] References Cited

U.S. PATENT DOCUMENTS

| 4,002,826 | 1/1977 | Iemenschot | 369/270 |
| 4,040,107 | 8/1977 | Bryer | 360/99.03 |
| 4,232,870 | 11/1980 | Iemenschot | 360/97 |
| 4,453,188 | 6/1984 | Johnson et al. | 360/86 X |
| 4,466,032 | 8/1984 | Saito | 360/135 |
| 4,539,613 | 9/1985 | Suyama et al. | 360/97 |

FOREIGN PATENT DOCUMENTS

0070557 1/1983 European Pat. Off. .
58-69372 11/1983 Japan .

Primary Examiner—David J. Severin
Attorney, Agent, or Firm—Toren, McGeady & Associates

[57] ABSTRACT

A recording and/or reproducing apparatus using a flexible magnetic disc having a center core or hub which is provided with at least one indication member for indicating rotation phase of the disc, comprises a pressing member for pressing the center core of the disc to mount the same on a drive spindle and a detection member for detecting the indication member on the center core of the disc at a predetermined position, wherein the pressing member is formed or arranged so that it never interferes with the detection member.

39 Claims, 5 Drawing Sheets

RECORDING AND/OR REPRODUCING APPARATUS

This is a continuation application of Ser. No. 07/449,301, filed Dec. 5, 1989, now abandoned, which in turn is a continuation application of Ser. No. 07/243,205, filed Sept. 9, 1988, now abandoned, which in turn is a continuation application of Ser. No. 07/107,860, filed Oct. 7, 1987, now abandoned, which is a continuation application of Ser. No. 06/648,700, filed Sept. 7, 1984, now abandoned.

BACKGROUND OF THE INVENTION

1. Field of the Invention

This invention relates to a recording and/or reproducing apparatus and more particularly to an apparatus using a disc-shaped record bearing medium.

2. Description of the Prior Art

Recording and/or reproducing apparatuses using, for example, a flexible magnetic disc as a record bearing medium are arranged to have the magnetic disc rotated by mounting the center core or hub thereof on a spindle or the like of a disc rotating motor. In this instance, if the engagement of the center core and the spindle is loose, the magnetic disc would not normally rotate. If, conversely, the engagement is too tight, the center core might be inadequately mounted on the spindle when the magnetic disc is loaded. To solve this problem, there has been proposed a magnetic coupling method in which a magnetizable piece such as an iron plate is secured to the center core and a magnet to the spindle so that the two can be magnetically coupled with each other. However, even with this magnetic coupling method employed, it is still difficult to ensure that the center core is correctly positioned on a reference plane such as a flange surface of the spindle when the center core is mounted on the spindle. It is thus difficult to keep the magnetic disc on a predetermined mounting plane which is arranged for positioning the magnetic disc relative to a signal recording and/or reproducing head. In the case of a still picture recording and/or reproducing apparatus which requires high precision in loading a record bearing medium, a force of several hundred grams is required for accurately mounting the center core on a spindle. In that case, therefore, use of a large magnet is mandatory. Then, the use of a large magnet comes to hinder efforts to reduce the size and weight of the apparatus.

This problem can be solved by arrangement to have the center core pushed by a pressing member in mounting the center core on the spindle in a manner as has been disclosed, for example, in U.S. patent application Ser. No. 591,383 filed Mar. 20, 1983, now abandoned.

Meanwhile, the apparatus of the above-stated kind is required to control and adjust the rotation phase of the magnetic disc to a predetermined phase in recording or reproducing a signal on or from the magnetic disc. To meet this requirement, at least one indicating member is provided on the center core of the disc for indicating the rotation phase of the disc while, on the side of the apparatus, a detecting member is arranged to detect this indicating member of the center core at a predetermined position and to produce a rotation phase signal. The apparatus of this kind is thus arranged to perform phase servo control over the disc rotating motor on the basis of the rotation phase signal thus obtained.

In cases where the rotation phase detecting member is thus provided in relation to the center core of the disc, the operating position of the detecting member is inevitably located very close to the operating position of the above-stated pressing member. This presents a problem as to how to prevent interference between the two members. Mechanical interference between them would damage or deform them or would hinder their operations to bring about an adverse effect on the recording or reproducing performance of the apparatus.

SUMMARY OF THE INVENTION

This invention is directed to the solution of the above-stated problems encountered by the prior art apparatuses. It is, therefore, a principal object of the invention to provide a recording and/or reproducing apparatus which is of the kind using a disc-shaped record bearing medium and is provided with mounting means arranged to be capable of adequately and reliably mounting the record bearing medium on rotating means in spite of presence of any interfering member.

Under this object, according to an aspect of the present invention, a recording and/or reproducing apparatus using a disc-shaped record bearing medium, comprises rotation means engageable with the medium for rotating the same, pressing means for pressing a portion of the medium to mount the same on the rotation means, and means interfering with the pressing means, wherein the pressing means is formed so that it does not interfere with the last named means.

It is another object of the invention to provide a recording and/or reproducing apparatus wherein a disc-shaped record bearing medium having at least one rotation phase indicating member provided on the center core or hub thereof; is used, and mounting means is arranged to permit the center core to be accurately and reliably mounted on rotating means without causing any damage, deformation or malfunction due to interference between the mounting means and detecting means which is arranged to detect the indicating member at a predetermined position.

Under this object, according to an embodiment embodying an aspect of the present invention, a recording and/or reproducing apparatus using a disc-shaped record bearing medium having a center core or hub which is provided with at least one indication member for indicating rotation state of the medium, comprises rotation means engageable with the medium at its center core for rotating the same, pressing means for pressing the center core of the medium to mount the same on the rotation means, and detection means for detecting the indication member on the center core of the medium at a predetermined position, wherein the pressing means is formed or arranged so that it does not interfere with the detection means.

These and further objects and features of the invention will become apparent from the following detailed description of a preferred embodiment thereof taken in conjunction with the accompanying drawings.

BRIEF DESCRIPTION OF THE DRAWINGS

A preferred embodiment of the invention will be described hereinafter with reference to the accompanying drawings, in which.

DETAILED DESCRIPTION OF THE PREFERRED EMBODIMENT

Figure 3:
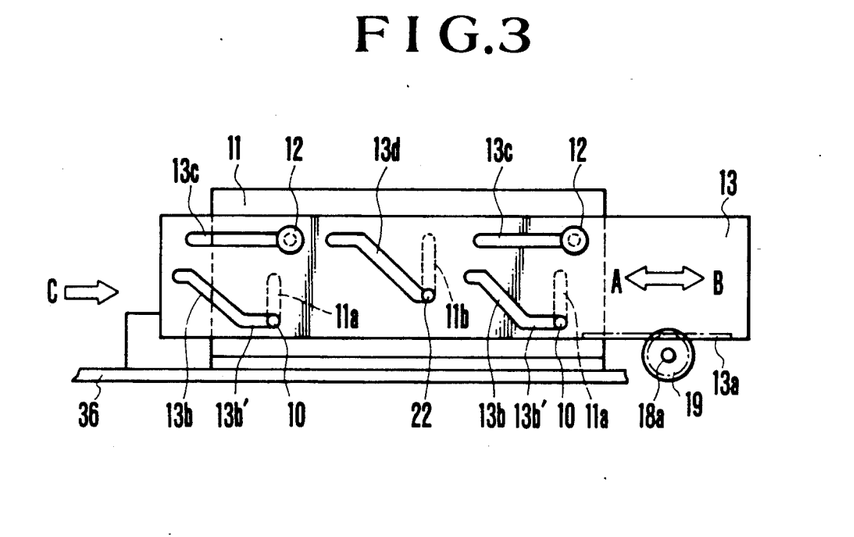
FIG. 3 is a side view taken along a line III—III of FIG. 2.
Figure 4:
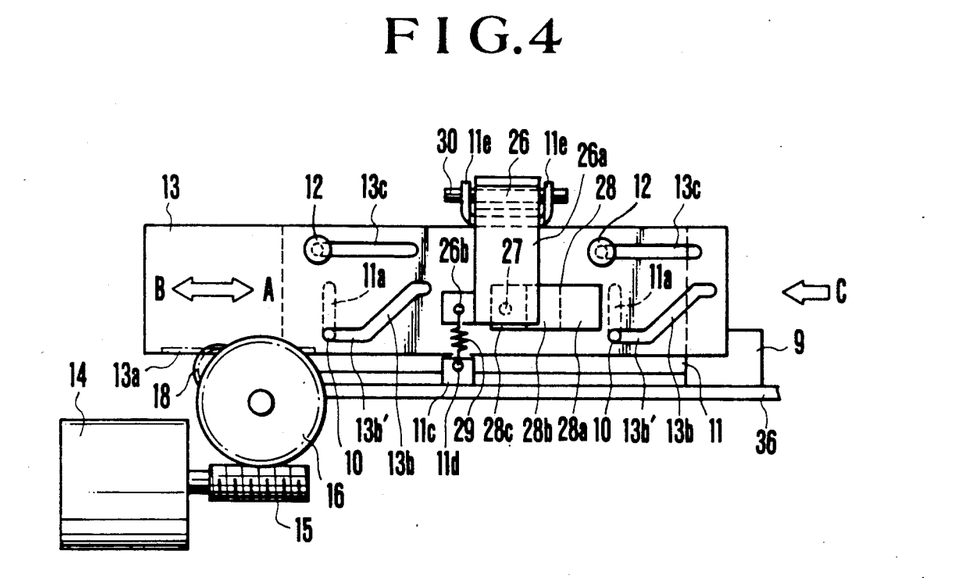
FIG. 4 is a side view taken along a line IV—IV of FIG. 2.
Figure 5:
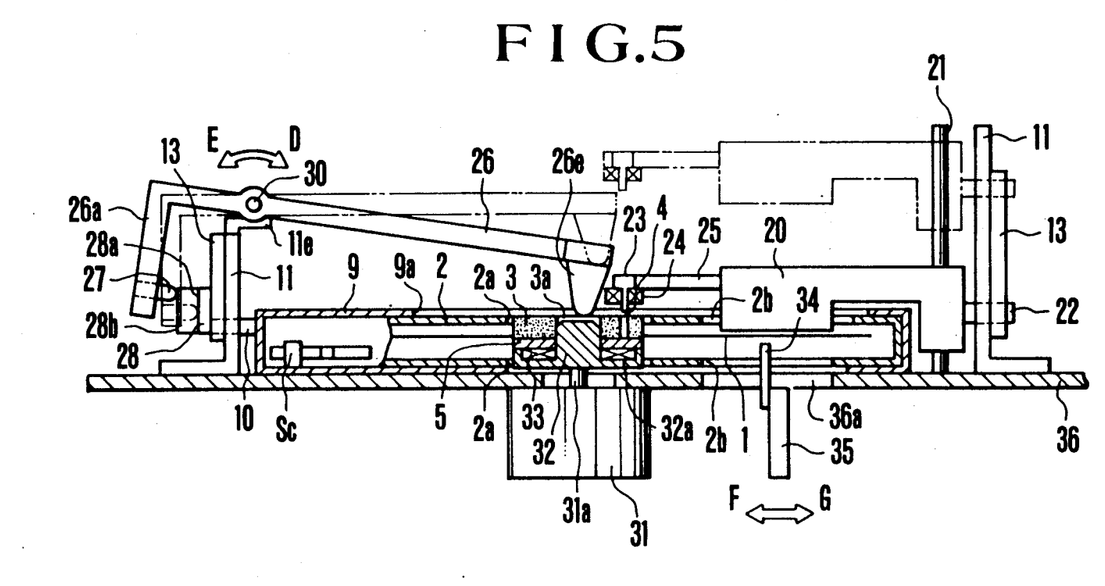
FIG. 5 is a sectional view taken along a line V—V of FIG. 2.

Referring to FIGS. 1-6, a flexible magnetic disc 1 is employed as a record bearing medium and, in this specific embodiment, is arranged to have recording tracks concentrically formed thereon. A cassette 2 is arranged to house the magnetic disc 1. The magnetic disc 1 has a center core or hub 3 attached at the middle part thereof. The center core 3 is provided with a center hole 3a. The disc 1 is thus arranged to be mounted through this hole 3a on a disc rotating spindle 32 of a disc rotating motor 31 as shown in FIG. 5. A magnetizable pin 4 (hereinafter will be called PG pin) is arranged on the center core 3 to serve as an indicating member for indicating the rotation phase of the disc 1. Circular openings 2a are provided in both sides of the cassette 2 in positions corresponding to the above-stated center core 3. Openings 2b are provided also in both sides of the cassette 2 for admitting a stabilizer plate 20 and a recording and-/or reproducing magnetic head 34 (FIG. 5) to the inside of the cassette 2. Positioning holes 2c and 2d are provided in the cassette 2 for placing the cassette 2 at a predetermined position for recording and/or reproduction in the apparatus. Pins 7 and 8 (FIG. 2) are erected on a chassis plate 36 of the apparatus body (FIGS. 3-5) and are respectively arranged to engage with the positioning holes 2c and 2d. A counter 6 is arranged on the cassette 2 to indicate the address of a next recording track. A magnetizable plate 5 such as an iron plate or the like is attached to the lower side of the center core 3. The above-stated PG pin 4 is magnetically connected to a portion of the magnetizable plate 5. As the PG pin 4 is magnetically influenced by the magnetic plate 5, the force of the magnet 33 reaches the PG pin 4 and the magnetic field is generated from the pin when the magnetic plate is loaded.

Figure 1:
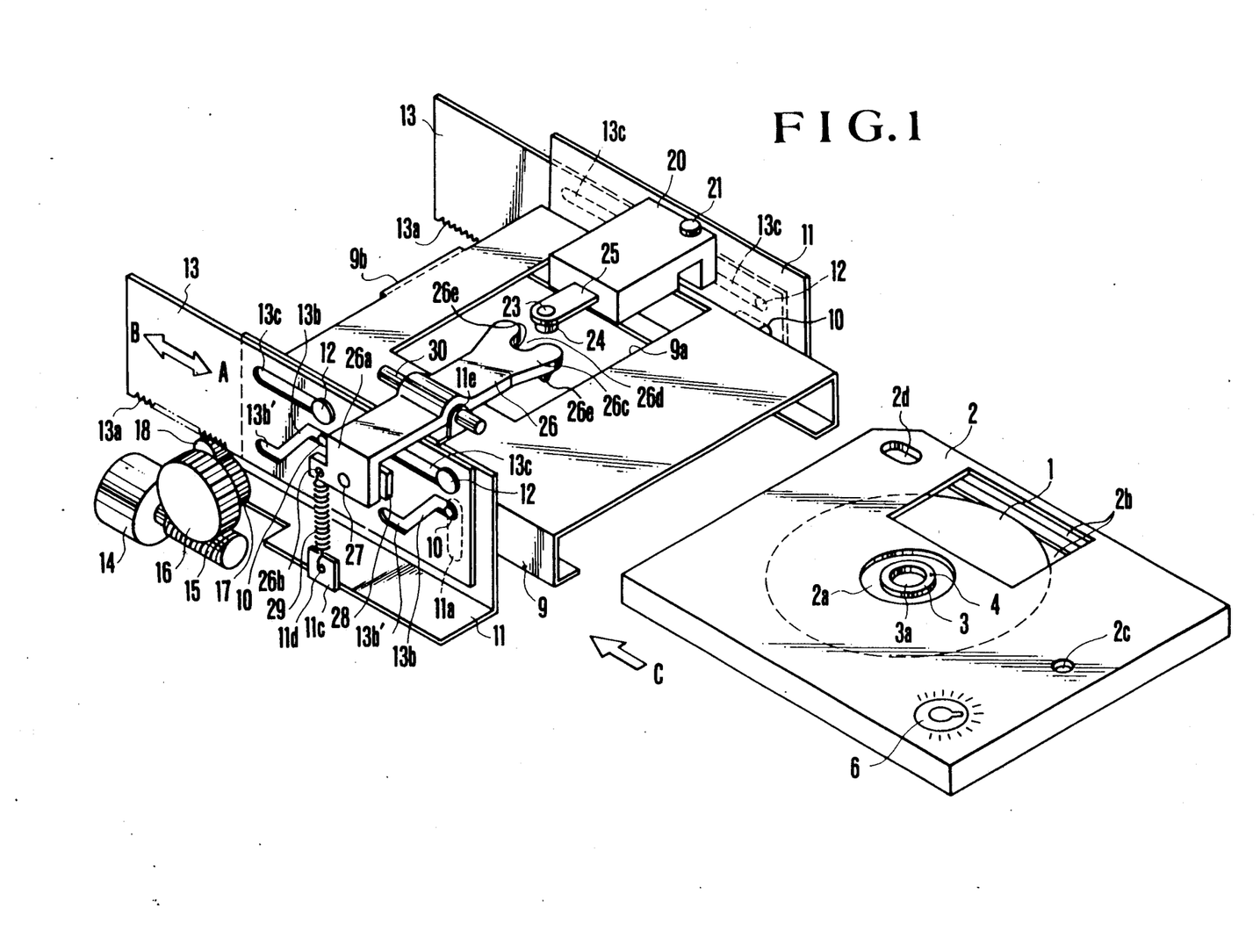
FIG. 1 is an oblique view showing the embodiment as in a state before it is loaded with a cassette.

A holder 9 is arranged to receive the cassette 2 and to have the latter inserted therein in the direction of arrow C until further insertion thereof is restricted by a restricting part 9b arranged at the end of the holder 9 as shown in FIG. 1. The cassette 2 is taken out from the holder 9 by pulling it in a direction reverse to the direction of arrow C. On each of the left and right sides of the holder 9 are provided two pins 10. A side plate 11 is secured to the chassis plate 36 of the apparatus body by means of screws or the like (not shown). Slots 11a are formed in the side plate 11 to vertically extend as viewed on FIG. 1. A pair of pins 12 are provided on the side plate 11. A slide plate 13 is arranged to be slidable in the directions of arrows A and B along the side plate 11 as shown in FIG. 1. The slide plate 13 is provided with a rack 13a, cam slots 13b and slots 13c which extend in the directions of arrows A and B. The pins 10 which are provided on the holder 9 engage with the cam slots 13b through the slots 11a of the side plate 11. The pins 10 are thus arranged to move vertically, i.e. in a direction perpendicular to the directions of arrows A and B, along the slots 11a according as the slide plate 13 moves in the direction of arrow A or B. The pins 12 which are provided on the side plate 11 engage with the slots 13c of the slide plate 13 to slidably support the slide plate 13 along the side plate 11 in the directions of arrows A and B. The pins 12 also restrict the slidable extent of the slide plate 13. The side plate 11 and the slide plate 13 are respectively arranged in pairs with another side plate 11 and another slide plate 13 together with the parts related to them on the left- and right-hand sides of the holder 9.

A worm gear 15 is arranged to be driven by a loading motor 14. A worm wheel 16 is arranged to engage with the worm gear 15. A gear 17 which is coaxial and in one unified body with the worm wheel 16 is arranged to engage with a pinion 18. The pinion 18 engages with the rack 13a of the slide plate 13. Further, the shaft 18a (FIG. 2) of the pinion 18 extends to the other slide plate 13 disposed on the opposite side of the holder 9 and is provided with another pinion 19, which is attached to the fore end of the shaft 18a and is arranged to engage the rack 13a of the other slide plate 13. Therefore, the left and right slide plates 13 are slidable in synchronism with each other.

Figure 2:
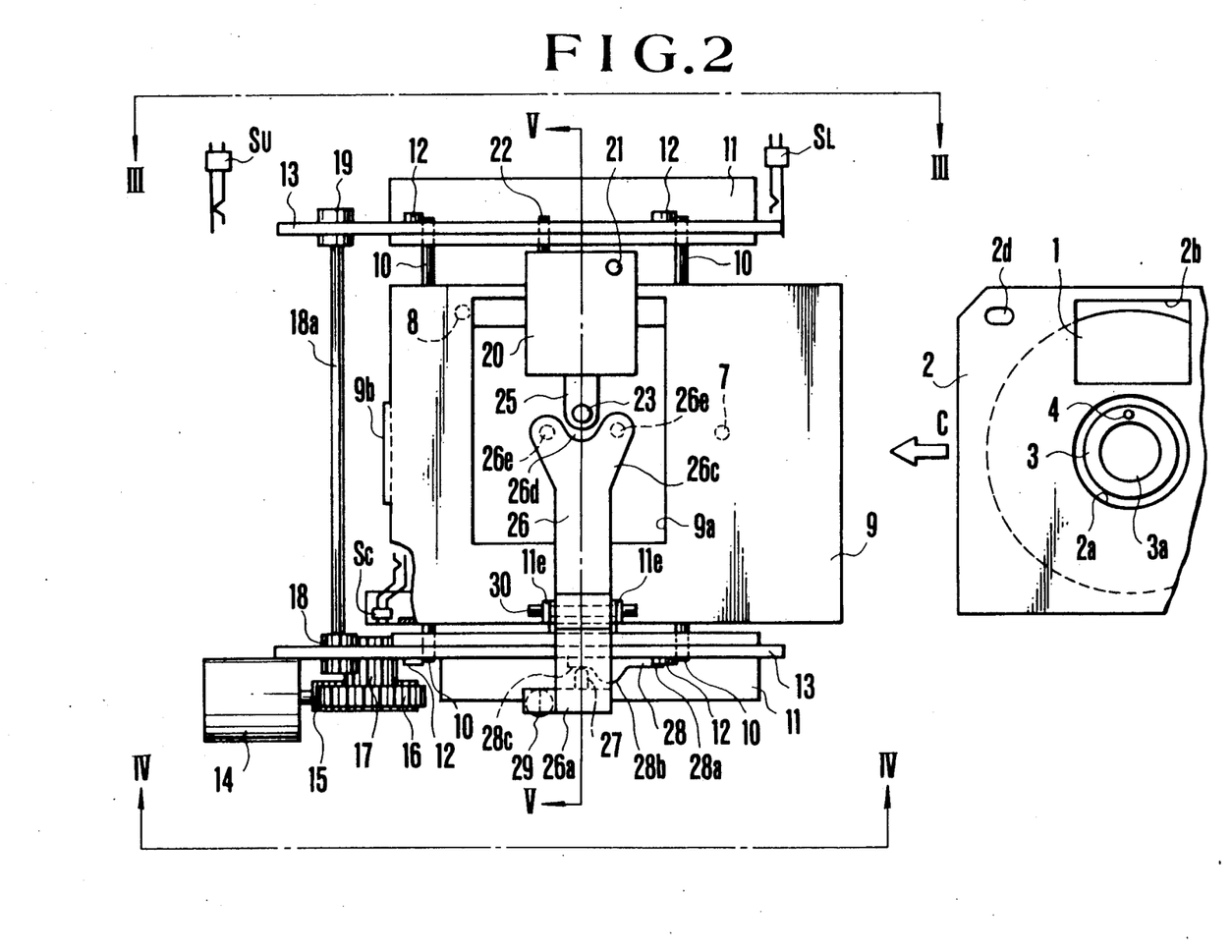
FIG. 2 is a plan view showing the embodiment of the present invention as in a state of being loaded with the cassette.

The stabilizer plate 20 is arranged to have the disc 1 travel in a stable manner at least at a head 34. A guide shaft 21 is arranged to have the stabilizer plate 20 movable upward and downward (see FIG. 5). A pin 22 (FIG. 2) is provided on the tail end of the stabilizer plate 20 and is arranged to engage with the cam slot 13d of one of the slide plates 13 via the slot 11b of one of the side plates 11 as shown in FIG. 3. Therefore, with the slide plates 13 sliding in the directions of arrows A and B, the pin 22 and the stabilizer plate 20 move upward and downward accordingly.

A yoke 23 and a coil 24 which is wound round the yoke 23 are arranged as detecting means for detecting the PG pin 4 disposed at the center core 3. The yoke 23 and the coil 24 are attached to the lower end face of a support plate 25 which is secured to the fore end face of the stabilizer plate 20. Referring to FIG. 5, when the position of the stabilizer plate 20 is lowered through the opening 9a of the holder 9 and the opening 2b of the cassette 2 to confront the disc 1, the yoke 23 and the coil 24 are set in a predetermined position to detect the PG pin 4.

A pressing member 26 is arranged to push the center core 3. A pin 27 is attached to the inner side of a bent-down part 26a formed at the tail end of the pressing member 26. The fore end of the pin 27 is formed in a spherical shape and is pushed by the force of a spring 29 against a cam 28 secured to the slide plate 13. The spring 29 has one end thereof connected to a hole 26b provided in the tail end bent-down part 26a of the pressing member 26 and the other end to a hole 11d provided in the bent part 11c of the side plate 11. A shaft 30 pivotally carries the pressing member 26 and is carried by a carrying part 11e of one of the side plates 11. The pressing member 26 is thus arranged to be turnable on the shaft 30 in the directions of arrows D and E as shown in FIG. 5.

Figure 6:
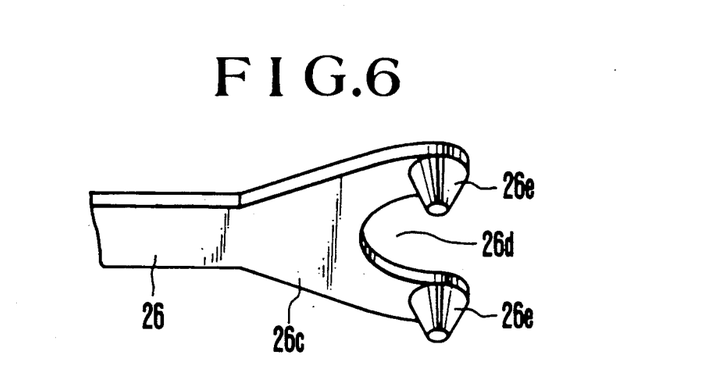
FIG. 6 is an oblique view showing details of the pressing part of a pressing member.

The fore end portion 26c of the pressing member 26 is provided with a recess 26d for avoiding collision with the detection coil 24 which otherwise interferes with the pressing member 26. In other words, the fore end portion of the pressing member 26 is formed in a forked shape. Referring to FIG. 6, the pressing member 26 is provided with pushing projections 26e which protrude from both sides of the recess 26d and are arranged to push at two points opposed at an angle of about 180 degrees to each other, i.e. located on a diametral line of the center core 3.

Referring again to FIG. 5, a disc rotating motor 31 is attached to the lower side of the chassis plate 36. A disc rotating spindle 32 is mounted on the fore end of the rotating shaft 31a of the motor 31 and is disposed on the upper side of the chassis plate 36. The spindle 32 has a diameter which is a slightly larger than the center hole 3a of the center core 3 and is provided with a flange part 32a which is arranged to define a reference plane for the center core 3. On the upper surface of the flange part 32a is mounted a magnet 33 which is arranged to attract the magnetizable plate 5 which is attached to the lower side of the center core 3. This magnet 33 causes the PG pin 4 to generate a magnetic flux, which is arranged to be detected by the coil 24. A signal recording and/or reproducing head 34 is arranged to confront the recording surface of the disc 1 through the opening 36a of the chassis plate 36 and the lower opening 2b of the cassette 2. A head carriage 35 carries the head 34. A known head shifting mechanism (not shown) is arranged to shift stepwise the head carriage 35 in the directions of arrows F and G. Meanwhile, a counter drive member which is responsive to this head shifting mechanism is arranged to drive the counter 6 of the cassette 2 in response to the stepwise shift of the head 34.

With the embodiment arranged as described above, when the cassette 2 is inserted either manually or by suitable mechanical means into the holder 9 in the direction of arrow C of FIG. 1 until insertion is restricted by the restricting part 9b of the holder 9, the motor 14 begins to operate in response either to detection of this insertion by a cassette detection switch (not shown) or to a manual operation on a switch. The rotation of the motor 14 then causes the slide plates 13 to slide in the direction of arrow A. The pins 10 of the holder 9 then move along the cam slots 13b of the slide plates 13. However, since the movement of the pins 10 in the directions of arrows A and B is prevented by the slots 11a of the side plates 11, the pins 10 in this instance move downward along the slots 11a in a direction perpendicular to the directions of arrows A and B. The holder 9 and the cassette 2 which is inserted in the holder 9 descend according as the pins 10 move downward. When the holder 9 and the cassette 2 reach a predetermined loading position on the chassis plate 36, the positioning pins 7 and 8 which are disposed on the chassis plate 36 engage respectively with the positioning holes 2c and 2d of the cassette 2. With the cassette 2 thus positioned, a cassette loading completion detecting switch detects the completion of cassette loading. The rotation of the motor 14 is then brought to a stop either in response to this detecting action or by a manual switch operation. With the motor 14 thus stopped from rotating, the cassette 2 is kept in the predetermined loading position.

On the other hand, the pin 22 erected on the tail end face of the stabilizer plate 20 moves along the cam slot 13d of one of the slide plates 13 according as the slide plate 13 moves in the direction of arrow A (see FIG. 3). However, since the pin 22 is prevented from moving in the directions of arrows A and B by the slot 11b of one of the side plates 11, the pin 22 moves downward along the slot 11b. FIGS. 3 and 5 show the pin 22 as in a state of having completed this downward movement. As a result of this downward movement, the stabilizer plate 20 is moved down along the guide shaft 21 to a predetermined position. With the stabilizer plate 20 in this position, an air layer is formed in a desired thickness between the disc confronting surface of the stabilizer plate 20 and the upper surface of the disc 1 when the disc 1 rotates. The air layer serves to keep a confronting relation between the head 34 and the disc 1 in a satisfactory state by allowing the disc 1 to travel in a stable manner. In this instance, the detecting coil 24 is set in the predetermined position to detect the PG pin 4 of the center core 3.

The center core pressing member 26 is normally set in a position as indicated by a two-dot-chain line in FIG. 5 by a low lift part 28a (FIGS. 2 and 5) of the cam 28. However, when the slide plates 13 move in the direction of arrow A of FIG. 1 at the time of loading the cassette 2, a high lift part 28b of the cam 28 on one of the slide plates 13 comes to push the pin 27 of the tail end bent-down part 26a of the pressing member 26. Therefore, the pressing member 26 turns on the shaft 30 in the direction of arrow D in FIG. 5. With the pressing member 26 turned in this manner, the pushing projections 26e provided at the fore end of the pressing member 26 push the center core 3 which is exposed at the opening 9a of the holder 9 and the opening 2a of the cassette 2 against the spindle 32, so that the magnetizable plate 5 can be correctly positioned on the reference plane defined by the flange part 32a of the spindle 32. The disc 1 which is thus mounted on the spindle 32 is rotated by the rotation of the spindle 32 relative to the head 34. During the rotation of the disc 1, the head 34 records or reproduces, for example, one field portion or one frame portion of a television signal every time the disc 1 makes one revolution. The recording or reproducing position of the head on the disc 1 is shifted by a shifting operation performed on the head carriage 35.

The high lift part 28b (FIGS. 2 and 5) of the cam 28 which is provided on the slide plate 13 is arranged to be located, under this condition, within an area corresponding to the lower horizontal portion 13b' of the cam slot 13b of the slide plate 13 (FIGS. 1, 3 and 4). In other words, at least with the cassette 2 in the lowered state, the high lift part 28b of the cam 28 is in a state of keeping the pressing member 26 to be in a state of pushing the center core 3. After this, a slight move of the slide plate 13 further in the direction of arrow A causes the center core 3 to be released from the pushing action of the pressing member 26 by a low lift part 28c of the cam 28 which turns the pressing member 26 in the direction of arrow E. Further, to absorb any excessive portion of the urging action of the high lift part 28b on the pressing member 26, the pressing member 26 is arranged to include an elastic portion at least in part.

The pressing member 26 is provided with the recess 26d formed in the pushing part 26c at the fore end thereof for avoiding collision with the detection coil 24. Therefore, the pressing or pushing action on the center core 3 and the ensuing action of releasing the center core 3 from the pushing action can be performed without damaging or deforming the detection coil and the pressing member 26 or causing malfunctions of them. The pressing member 26 is caused to perform the pushing action by the cam 28 only when this action is required as mentioned in the foregoing. Therefore, the pressing member 26 never imposes any extra load on the disc rotating motor 31 during recording or reproduction. The disc rotation phase signal which is obtained with the PG pin 4 of the center coil 3 detected by the detection coil 24 during the rotation of the disc 1 is arranged to be used, for example, for control over the rotation phase of the motor 31.

In unloading the cassette 2, the embodiment operates as follows: The motor 14 is caused to rotate reversely, for example, by operating an ejecting operation member (not shown). With the motor 14 thus rotated reversely, the slide plates 13 are moved in the direction of arrow B. This causes the holder 9 to ascend. The cam 13d of the slide plate 13 causes the stabilizer plate 20 to move upward along the guide shaft 21 to a position indicated by the two-dot-chain line in FIG. 5. Immediately before the ascent of the cassette 2, the pressing member 26 is once turned in the direction of arrow D of FIG. 5 from the released position indicated by the two-dot-chain line to the pushing position indicated by the full line. Following that, the pressing member 26 is again turned in the direction of arrow E to the released position indicated by the two-dot-chain line to be kept there.

When the holder 9 ascends to the predetermined position, this is, for example detected by a detection switch and the motor 14 is stopped from rotating by the output of this switch. Or, the rotation of the motor 14 may be stopped by a manual switch operation. With the motor 14 thus stopped, the cassette 2 can be taken out from the holder 9.

Figure 7:
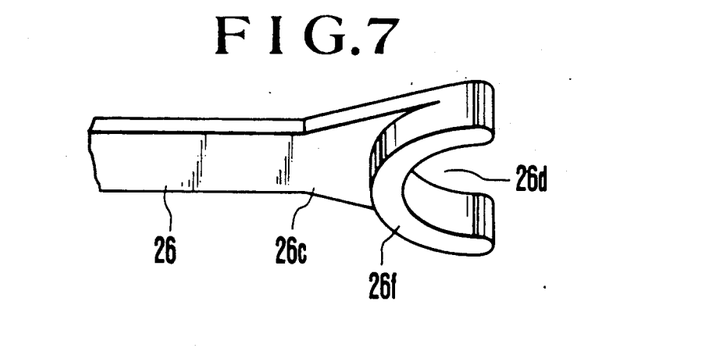
FIG. 7 is an oblique view showing details of a modification of the pressing part of the pressing member.

While the pressing or pushing part 26c of the pressing member 26 is arranged to have two pushing projections 26e on both sides of the recess 26d which are arranged to push the center core 3 at two points on a diametric line of the center core 3 as shown in detail in FIG. 6, this arrangement may be modified, for example, as shown in FIG. 7. In the case of the modification shown in FIG. 7, the pushing projections 26e are replaced with a semicircular projection 26f which is formed along the recess 26d provided for avoiding the detection coil 24. In another modification example, the two pushing projections 26e are replaced with three or more projections 26e which are arranged along the arcuate shape of the recess 26d.

Figure 8:
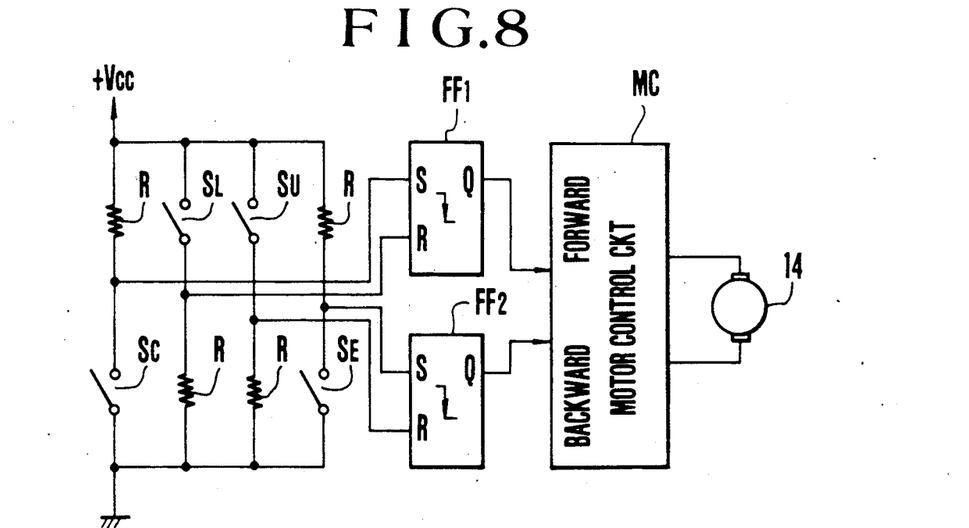
FIG. 8 is a diagram showing an example of a motor control circuit.

FIG. 8 shows an example of control circuit arrangement for the loading motor 14. The circuit arrangement includes a normally open type switch SC for detecting the cassette 2. The switch SC is arranged, for example, to be closed by the cassette 2 when the cassette 2 is inserted into the holder 9 until further insertion is restricted by the restricting part 9b of the holder 9. A normally closed type switch SL is arranged to detect completion of a cassette loading operation. For example, the switch SL is opened when the slide plates 13 are moved in the direction of arrow A to their end positions as shown in FIG. 2. A normally open type switch SE is arranged to be closed by the operation of the ejecting operation member or the like. Another normally closed type switch SU is provided for the purpose of detecting completion of a cassette unloading operation. The switch SU is opened, for example, when the slide plates 13 are moved in the direction of arrow B to their end position in that direction. These switches SC, SL, SE and SU are respectively connected to resistors R as shown in the drawing. A first RS flip-flop FF1 of the fall edge synchronizing type is arranged to be set when the switch SC is turned on and to be reset when the switch SL is turned off. A second RS flip-flop FF2 of the fall edge synchronizing type is arranged to be set when the switch SE is turned on and to be reset when the switch SU is turned off. A motor control circuit MC is arranged to have the slide plates 13 moved in the direction of arrow A by causing the motor 14 to rotate in a predetermined direction, for example, when the Q output of the first flip-flop FF1 is at a high level and to have the slide plates 13 moved in the direction of arrow B by causing the motor 14 to rotate reversely when the Q output of the second flip-flop FF2 is at a high level.

In loading the cassette 2, the cassette detecting switch SC is turned on when the cassette 2 comes to be restricted by the restricting part 9b. With the switch SC turned on, the first flip-flop FF1 is set. The level of the Q output of the flip-flop FF1 then becomes high. In response to the high level of the Q output, the motor control circuit MC causes the motor 14 to rotate in a predetermined direction. This causes the slide plates 13 to slide in the direction of arrow A. After the cassette 2 is set in its loading position with the pressing member 26 operated and after the stabilizer plate 20 is set in its operative position, the slide plates 13 reach their end positions in the direction of arrow A. Then, the loading completion detecting switch SL is turned off. With the switch SL thus turned off, the first flip-flop FF1 is reset. The level of the Q output of the flip-flop FF1 becomes low. This causes the motor control circuit MC to stop the motor 14.

In unloading the cassette 2, the second flip-flop FF2 is set when the switch SE is closed by the operation of the ejecting operation member. The level of the Q output of the flip-flop FF2 becomes high. In response to the high level Q output of the flip-flop FF2, the motor control circuit MC causes the motor 14 to rotate reversely. The slide plates 13 are then moved in the direction of arrow B. As a result of that, the holder 9, the pressing member 26 and the stabilizer plate 20 are brought back to their original positions. After that, the slide plates 13 reach their end positions in the direction of arrow B to turn off the unloading completion detecting switch SU. With the switch SU turned off, the second flip-flop FF2 is reset and the level of the Q output thereof becomes low. This causes the motor control circuit MC to stop the rotation of the motor 14.

In the recording and/or reproducing apparatus according to the invention, as described in detail in the foregoing, the pressing means ensures that the record bearing medium is correctly and reliably mounted on the rotating means without causing any interference or collision between the pressing means and other members. The invention is therefore advantageously applicable to the apparatuses of this kind.

While the invention is applied to a recording and/or reproducing apparatus of the type using a magnetic disc as record bearing medium in the specific example of embodiment thereof given in the foregoing, the invention is of course applicable also to apparatuses of other types using different record bearing media such as an optical disc, etc. Further, the rotation phase detecting means (23 and 24) is arranged to detect a magnetic flux produced from the PG pin 4 of the center core 3 of the disc 1. In accordance with the invention, however, this arrangement of the rotation phase detecting means may be replaced with some other arrangement in which, for example, one or a plurality of reflecting or non-reflecting faces are arranged on the upper surface of the center core 3; and a photo-coupler consisting of light-emitting and light-receiving elements is arranged to detect the reflecting or non-reflecting face or faces.

What is claimed is:

1. A recording and/or reproducing apparatus using a disc-shaped record bearing medium, comprising:
   (A) head means for recording signals on and/or reproducing recorded signals from the medium;
   (B) rotating means engageable with the medium for rotating said medium relative to said head means;
   (C) detecting means for detecting the rotation of said medium at a position near and opposite to a center portion of the medium on the rotating means; and
   (D) pressing means for pressing said center portion of the medium relative to said rotating means to exactly mount the medium on the rotating means, and for releasing the pressing operation after the mounting of said medium on the rotating means, said pressing means having a portion formed to avoid said detecting means and being provided opposite to said center portion of the medium and separately from said detecting means so that said pressing means does not interfere with the detecting means during the pressing and releasing operation of said pressing means.

2. The apparatus according to claim 1, further comprising:
   stabilizing means for stabilizing the medium relative to said head means;
   and said detecting means being provided on a portion of said stabilizing means.

3. The apparatus according to claim; 1, further comprising:
   holder means for receiving therein the medium and movable for placing the received medium at a predetermined position for the signal recording and/or reproduction; and
   control means for causing said pressing means to operate in response to the movement of said holder means to place the received medium at said predetermined position.

4. The apparatus according to claim 3, wherein said control means is arranged to cause said pressing means to press the portion of the medium and thereafter release said pressing in response to the movement of said holder means to place the medium at said predetermined position.

5. The apparatus according to claim 1, wherein said pressing means has a fork shape so as to avoid said detecting means.

6. The apparatus according to claim 5, wherein said pressing means has at least two pressing portions respectively provided on two arms of the fork shape to act on respective almost diametrically opposite portions of the medium.

7. The apparatus according to claim 5, wherein said detecting means has a portion protruding in between two arms of the fork shape of said pressing means.

8. A recording and/or reproducing apparatus using a disc-shaped record bearing medium having a center core which is provided with an engaging hole and at least one indication member for indicating a rotation state of the medium, said apparatus comprising:
   (A) head means for recording signals on and/or reproducing recorded signals from the medium;
   (B) rotating means engageable with the center core of the medium relative to said head means;
   (C) detecting means for detecting the indication member on the center core of the medium, said detection means being arranged at a predetermined position near and opposite to the center core; and
   (D) pressing means for pressing the center core of the medium to mount the same on said rotating means, said pressing means being arranged to press an area of the center core other than an area of the center core opposite to said detection means, so as to press the area on said center core which is not opposite to said detection means so that the pressing means does not interfere with the detection means.

9. The apparatus according to claim 10, further comprising:
   stabilizing means for stabilizing the medium relative to said head means;
   said detection means being provided on a portion of said stabilizing means.

10. The apparatus according to claim 8, further comprising:
    holder means for receiving therein the medium and movable for placing the received medium at a predetermined position for the signal recording and/or reproduction; and
    control means for causing said pressing means to operate in response to the movement of said holder means to place the received medium at said predetermined position.

11. The apparatus according to claim 10, wherein said control means is arranged to cause said pressing means to press the portion of the medium and thereafter release said pressing in response to the movement of said holder means to place the medium at said predetermined position.

12. The apparatus according to claim 8, wherein said pressing means has a fork shape so as to avoid said detection means.

13. The apparatus according to claim 12, wherein said pressing means has at least two pressing portions respectively provided on two arms of the fork shape to act on respective almost diametrically opposite portions on an annular surface of the center core of the medium.

14. The apparatus according to claim 12, wherein said detection means has a portion protruding in between two arms of the fork shape of said pressing means.

15. A magnetic recording and/or reproducing apparatus using a flexible magnetic disc having a center core which is provided with an engaging hole, an annular shaped magnetizable plate and at least one magnetizable pin connected to the magnetizable plate, said apparatus comprising:
    (A) a magnetic head for recording signals on and/or reproducing recorded signals from the disc;
    (B) a rotating spindle for rotating the disc relative to said head, said spindle being engageable with the center core of the disc at its engaging hole and having a flanged portion for receiving thereon the center core;
    (C) a magnetic provided on the flanged portion of said spindle for attracting the magnetizable plate attached to the center core of the disc;
    (D) a magnetic pick-up member for picking up a magnetic flux generated by said at least one magnetizable pin attached to the center core of the disc, said magnetic pick-up member being arranged opposite to the center core;
    (E) a pressing member for pressing the center core of the disc relative to the flanged portion of said spindle, said pressing member having a portion for avoiding said pick-up member so that the pressing member does not collide with the pick-up member when said pressing member presses the center core; and (F) an operation mechanism for causing said pressing member to operate on the center core of the disc to engage the center core and said spindle.

16. The apparatus according to claim 15 wherein said operation mechanism is arranged to cause said pressing member to operate on the center core of the disc and thereafter release said pressing.

17. The apparatus according to claim 15, further comprising:
a stabilizing member for stabilizing the disc relative to said head, said stabilizing member being arranged to face with a surface of the disc;
said pick-up member being provided on a portion of said stabilizing member.

18. The apparatus according to claim 15, wherein said portion of said pressing means has a recessed or cut out portion for avoiding said pick-up member.

19. The apparatus according to claim 18, wherein said pressing member is arranged to act on an annular surface of the center core of the disc at almost diametrically opposite portion.

20. A magnetic recording and/or reproducing apparatus using a flexible magnetic disc having a center core which is provided with an engaging hole, an annular shaped magnetizable plate provided on one side of said center core of said disc and at least one magnetizable pin connected to the magnetizable plate provided on the other side of said disc, said apparatus comprising:

(A) a magnetic head for recording signals on and/or reproducing recording signals from the disc;

(B) a rotating spindle for rotating the disc relative to said head, said spindle being engageable with the center core of the disc at its engaging hole and having a flanged portion for receiving thereon the center core;

(C) a magnetic provided on the flanged portion of said spindle for attracting the magnetizable plate attached to the center core of the disc;

(D) a magnetic pick-up member which i provided opposite to said center core in the other side of said core for picking up a magnetic flux generated by said magnetizable pin attached to the center core of the disc;

(E) a pressing member which is provided opposite to said center core in the other side of said core for pressing the center core of the disc relative to the flanged portion of said spindle, said pressing member having a portion formed to avoid said pick-up member so that the pressing member does not collide with the pick-up member when said pressing member presses the center core; and (F) an operation mechanism for causing said pressing member to operate on the center core of the disc to engage the center core and said spindle.

21. The apparatus according to claim 20, wherein said avoiding portion of said pressing means is a recessed or cutout portion.

22. The apparatus according to claim 20, wherein said pressing member is arranged to act on an annular surface of the center core of the disc at almost diametrically opposite portions.

23. The apparatus according to claim 20, wherein said operation mechanism is arranged to cause said pressing member to operate on the center core of the disc and thereafter release said pressing.

24. The apparatus according to claim 20, further comprising:
a stabilizing member for stabilizing the disc relative to said head, said stabilizing member being arranged to face with a surface of the disc;
said pickup member being provided on a portion of said stabilizing member.

25. A magnetic recording and/or reproducing apparatus using a flexible magnetic disc having a center core which is provided with an engaging hole, an annular shaped magnetizable plate and at least one magnetizable pin connected to the magnetizable plate, said apparatus comprising:

(A) a magnetic head for recording signals on and/or reproducing recorded signals from the disc;

(B) a rotating spindle for rotating the disc relative to said head, said spindle being engageable with the center core of the disc at its engaging hole and having a flanged portion for receiving thereon the center core;

(C) a magnet provided on the flanged portion of said spindle for attracting the magnetizable plate attached to the center core of the disc;

(D) a magnetic pick-up member provided opposite to the center core for picking up a magnetic flux generated by said magnetizable pin attached to the center core of the disc;

(E) a pressing member for pressing the center core of the disc relative to the flanged portion of said spindle, said pressing member arranged to oppose said pick-up member so that the pressing member does not collide with the pick-up member when said pressing member presses the center core; and (F) an operation mechanism for causing said pressing member to operate on the center core of the disc to engage the center core and the spindle..

26. An apparatus according to claim 25, wherein said pressing member is pivoted at a portion in the apparatus and rotates to press the center core toward said flanged portion of said spindle.

27. An apparatus according to claim 25, wherein said pressing member has at least two projections to press the center core.

28. An apparatus according to claim 25, wherein said pressing member has a recess portion for preventing the pressing member from colliding with the pickup member.

29. An apparatus according to claim 28, wherein said pressing member has at least two projections provided on opposing sides of said recess portion so that the pressing member presses said center core around said recess portion.

30. An apparatus using a disc-shaped record bearing medium having a concentrical circular engaging portion and at least one rotation indication portion provided on said engaging portion, comprising:

(A) rotation means for retaining and rotating the medium;

(B) pressing means for pressing the medium to load the medium on said rotation means at the engaging portion of the medium, said pressing means ceasing the pressing of the medium while said medium is rotating; and (C) detection means for detecting the rotation indication portion of the medium while said medium rotates, said detection means being provided separately from said pressing means and being arranged to avoid interference with the pressing operation of said pressing means.

31. An apparatus according to claim 30, wherein said pressing means includes:
   (a) a pressing member for pressing the medium; and
   (b) control means for controlling a pressing state of said pressing member, said control means causing the pressing member to press the engaging portion of the medium and subsequently causing the pressing member to detach from the engaging portion of the medium.

32. An apparatus according to claim 30, wherein said rotation indication portion includes a magnetizable pin and said detection means includes a magnetic sensor.

33. An apparatus according to claim 30, wherein said pressing means presses a portion of said concentrical circular engaging portion and being partly cut out so as to avoid interference with the detection means.

34. An apparatus according to claim 33, wherein said pressing means is fork-shaped.

35. A recording and/or reproducing apparatus arranged to use a disc-shaped record bearing medium having a concentrical engaging portion and at least one rotation indication portion provided on said engaging portion, said apparatus comprising:
   (A) recording and/or reproducing head means for recording signals on and/or reproducing recorded signals from said record bearing medium;
   (B) rotating means for rotating the medium relative to said head means, said rotating means being engageable with said engaging portion of the medium and having a receiving surface for receiving thereon the engaging portion of the medium;
   (C) pressing means for pressing said engaging portion of the medium against said receiving surface of the rotating means, said pressing means ceasing the pressing of the medium while said medium is rotating; and
   (D) detection mean for detecting the rotating indication portion of the medium while said medium is rotating, said detection means being formed separately from the pressing means and being arranged to avoid interference with the pressing operation of said pressing means.

36. An apparatus according to claim 35, wherein said pressing means includes:
   (a) a pressing member for pressing the medium; and
   (b) control means for controlling a pressing state of said pressing member, said control means causing the pressing member to press the engaging portion of the medium and subsequently causing the pressing member to detach from the engaging portion of the medium.

37. An apparatus according to claim 35, wherein said rotation indication portion includes a magnetizable pin and said detection means includes a magnetic sensor.

38. An apparatus according to claim 35, wherein said pressing means presses a portion of said concentrical circular engaging portion and being partly cut out so as to avoid interference with the detection means.

39. An apparatus according to claim 38, wherein said pressing means is fork-shaped.

* * * * *